May 15, 1962 J. W. ELDRED 3,034,822
ARTICLE HANDLING APPARATUS
Filed Aug. 3, 1959 6 Sheets-Sheet 5
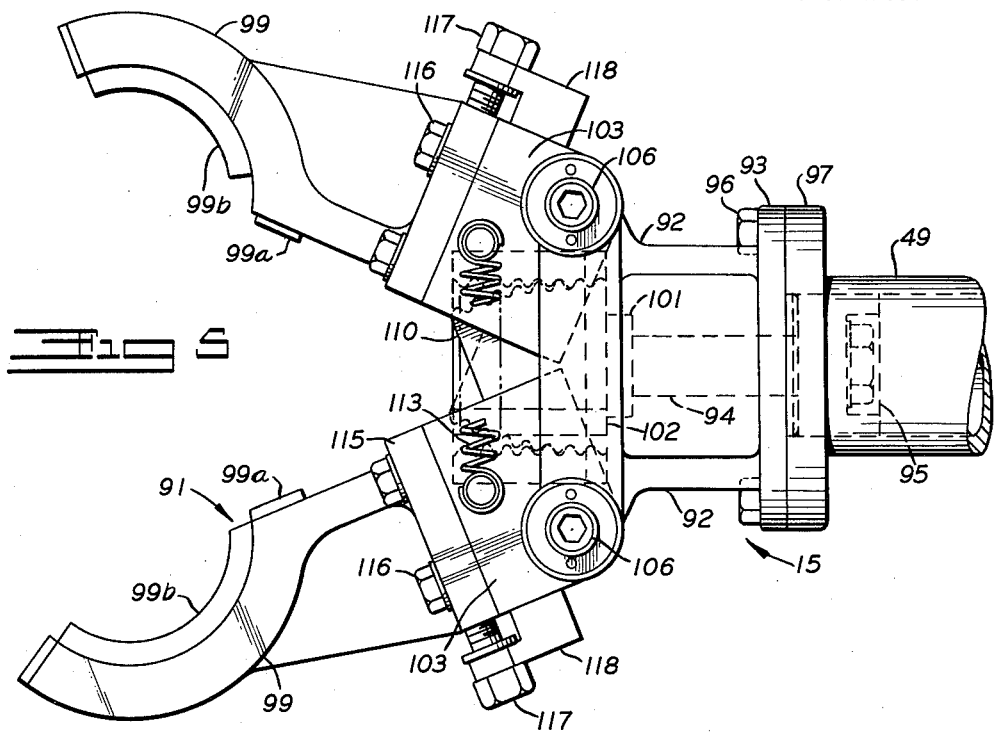
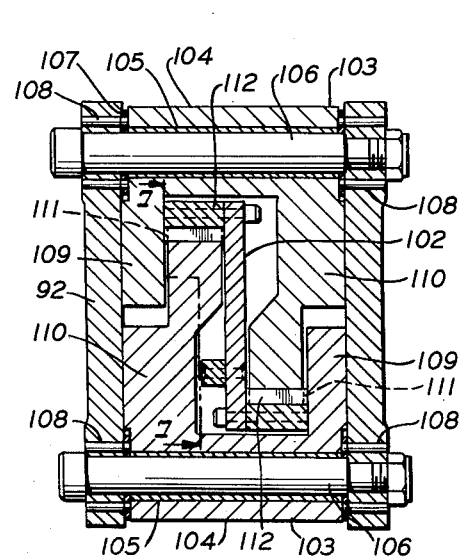
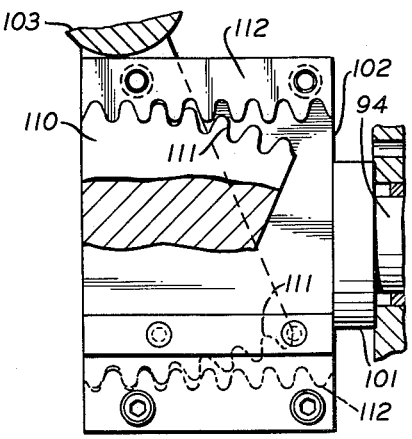
INVENTOR.
JOHN W. ELDRED
BY- MAHONEY, MILLER &
RAMBO, ATT'YS.

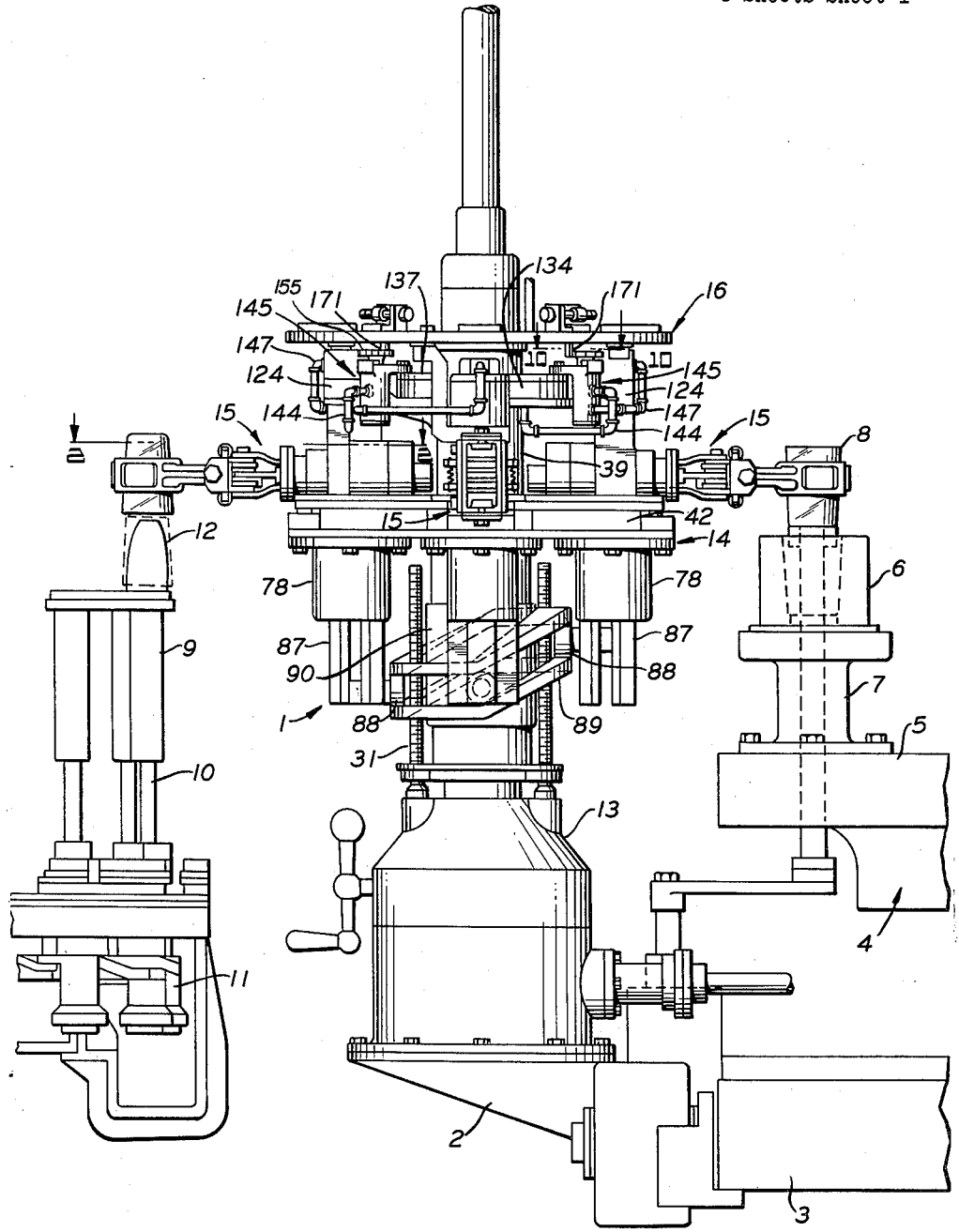

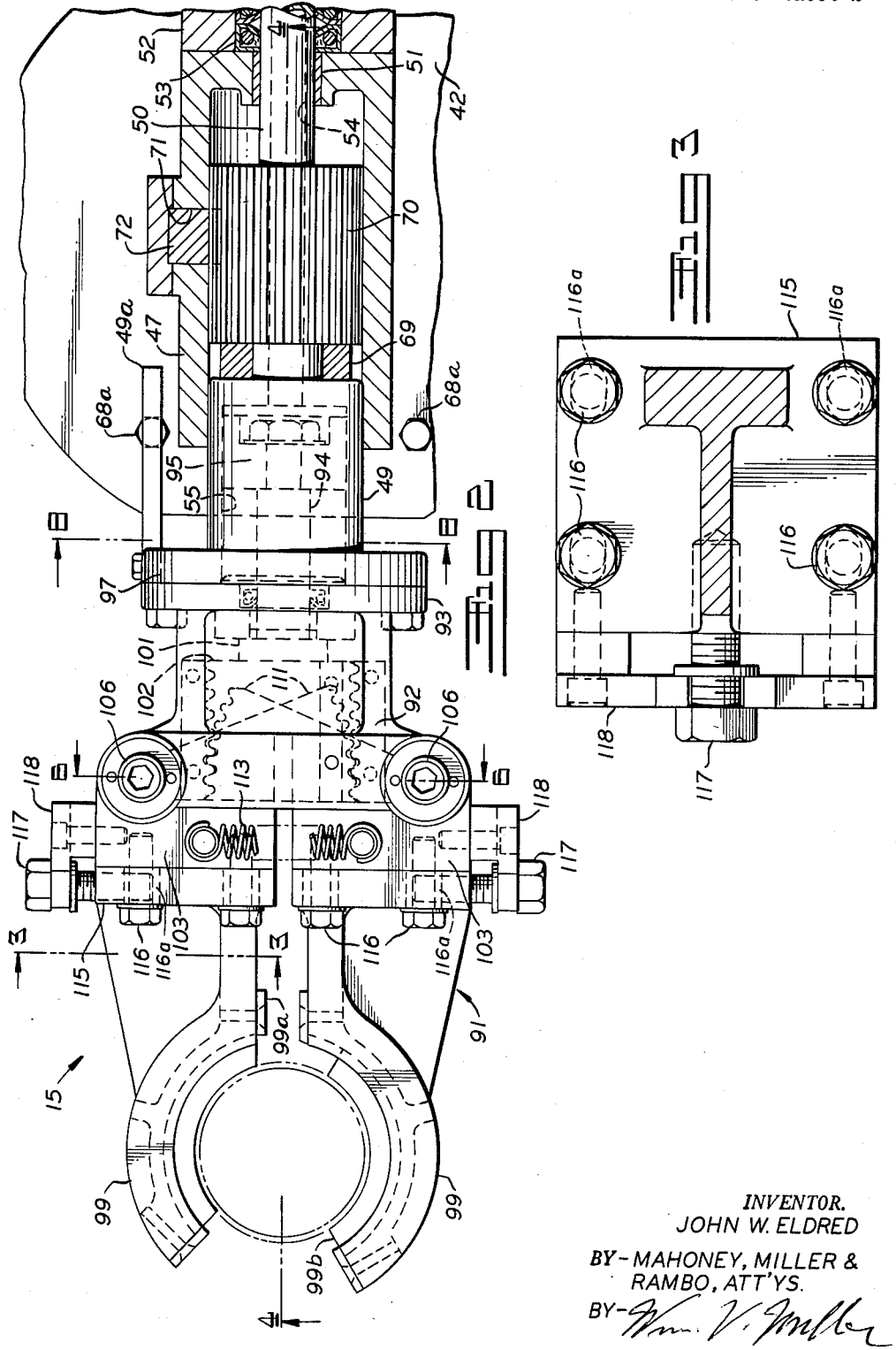

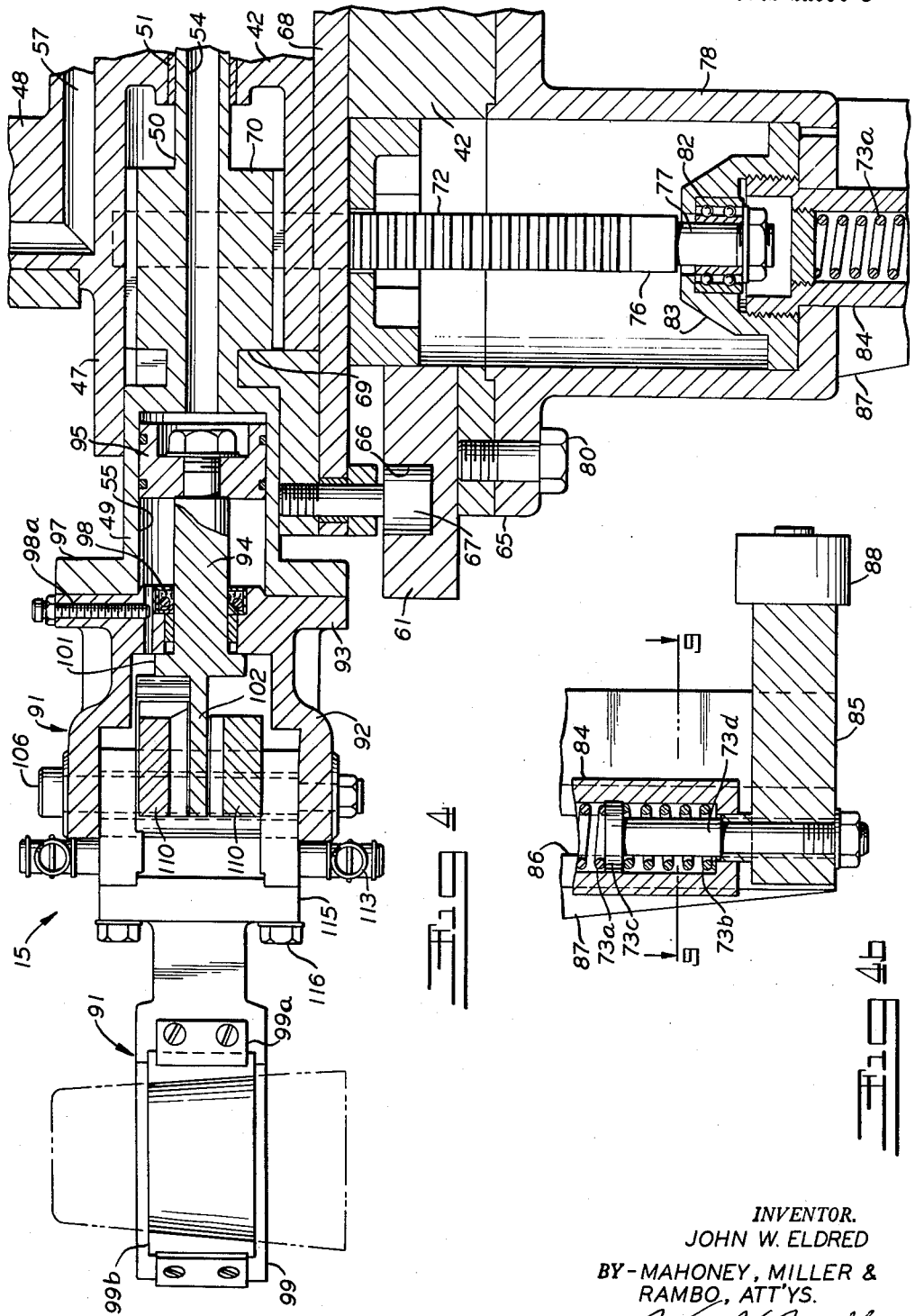

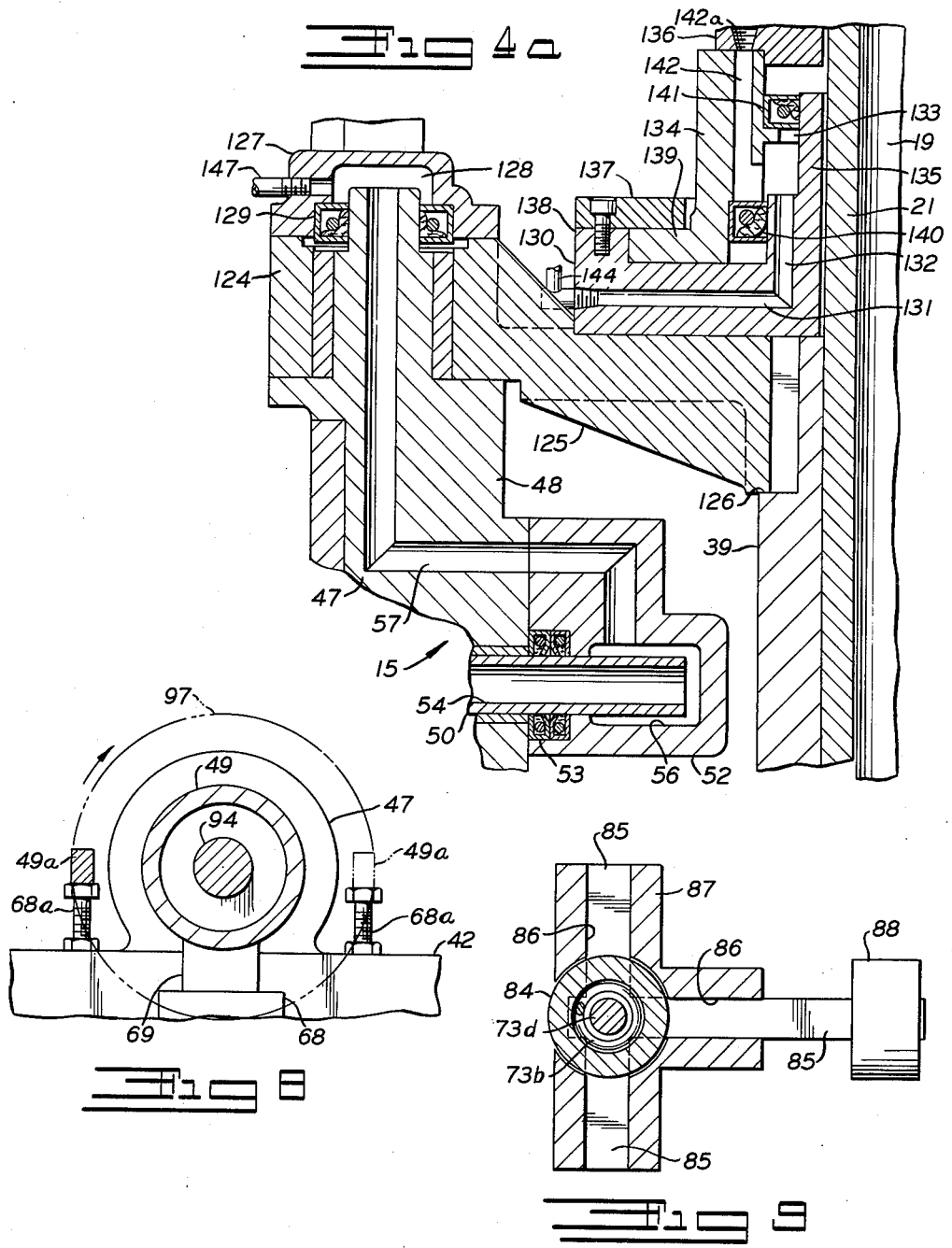

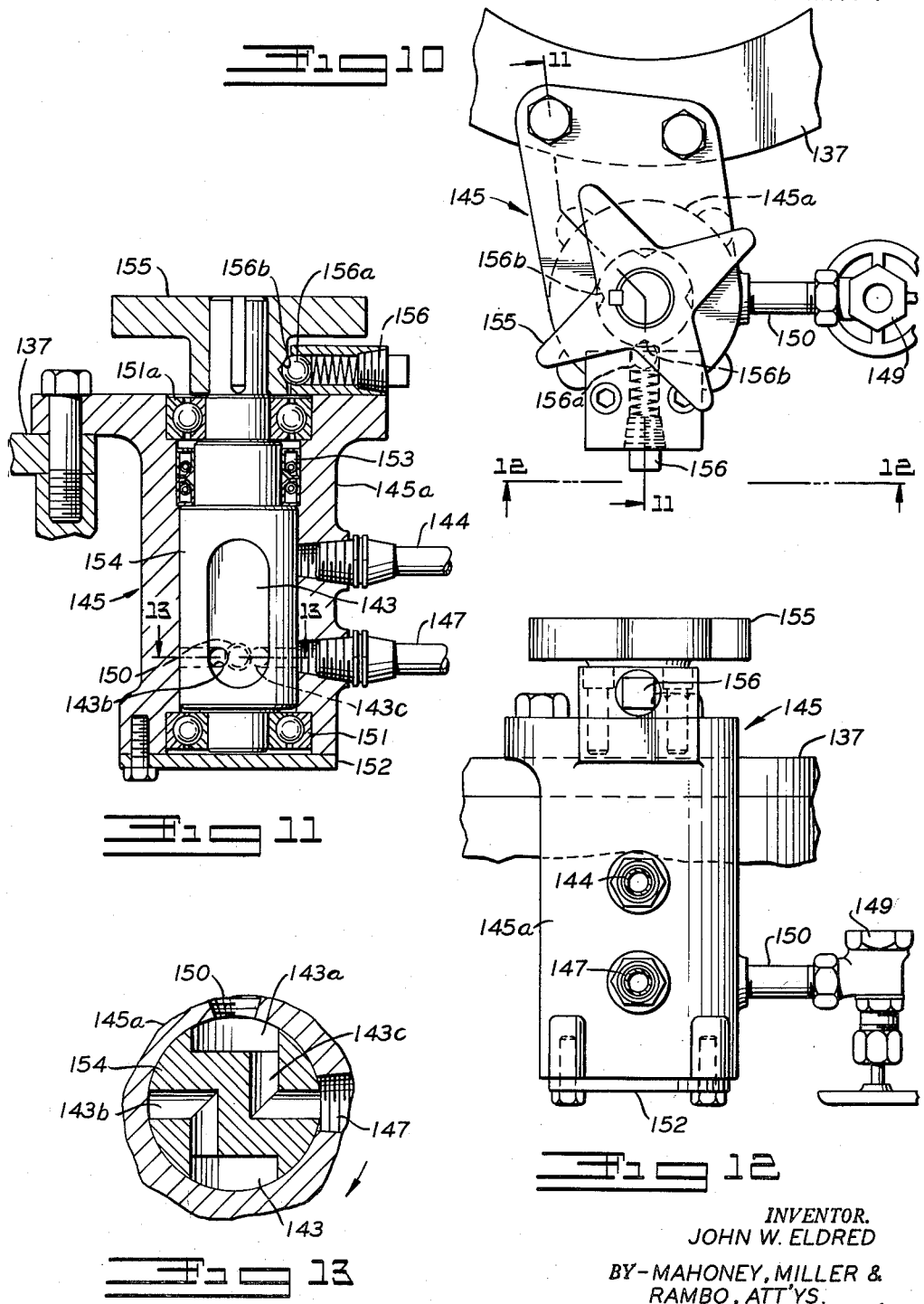

United States Patent Office 3,034,822
Patented May 15, 1962

3,034,822
ARTICLE HANDLING APPARATUS
John W. Eldred, 723 Grandon Ave., Columbus, Ohio
Filed Aug. 3, 1959, Ser. No. 831,195
4 Claims. (Cl. 294—88)

My invention relates to article handling apparatus. It has to do, more particularly, with apparatus for handling glassware although it is not necessarily limited thereto. It is especially useful for removing glassware from automatic glass forming machines and transferring the ware to a moving conveyor or some other support remote from the forming machine. However, although I describe this invention as being particularly for the purpose of handling articles of glassware, it is to be understood that it can be used for various other article handling and transferring operations.

In my Patent No. 2,415,997 which issued February 18, 1947, I disclose an article handling or transferring machine which is of the continuously rotating turret type. This machine was described as being positioned between a glass forming machine of an intermittently rotatable type and a continuously moving conveyor. This article handling machine automatically picked up the ware from the forming machine and transferred it to a continuously moving conveyor and inverted the ware during the transfer.

The machine described in said patent consisted mainly of a continuously rotating turret which carried a plurality of radially extending circumferentially spaced article handling units. Each of these units included tongs which were adapted to grip the article. On that machine mechanism was provided for inverting the article handling units during the continuous rotation of the turret, so that they would remove the articles from the forming machine and invert them and deposit them on the conveyor. The radially extending article handling units were mounted on the turret for swinging movement and limited radial extension in a horizontal plane. Means was also provided in association with the turret for controlling the swinging and limited radial extension of each article handling unit during rotation of the turret. This means provided for a dwell period at the time the tongs of each successive unit moved into association with the article on the forming machine to grip it and at the same time another unit moved into association with the conveyor and the tongs thereof were operated to release an article. Thus, although the turret moved continuously, it operated properly with an intermittently operating forming machine and with a continuously moving straight-line conveyor to transfer articles from the former to the latter without breakage, distortion or toppling of the ware due to the provision of the dwell periods at the article-engaging and discharging points.

The present invention relates to certain improvements on the machine disclosed in said prior patent. These improvements are concerned mainly with the tong structure of each of the article handling units, with the structure for inverting the article handling units, and with the valve structure for controlling operation of the tongs of each of the units.

The accompanying drawings illustrate a machine for handling various articles of glassware and the machine is of the general structural disclosed in my said prior patent and the improvements of this present invention are illustrated as being applied to that type of machine.

In these drawings:

FIGURE 1 is a side elevational view of an article handling machine having the improvements contemplated by this invention.

FIGURE 2 is a horizontal sectional view taken along line 2—2 of FIGURE 1 through an article handling unit and illustrating the improved tong unit of this invention and showing the tongs thereof in closed condition.

FIGURE 3 is a transverse vertical sectional view taken along line 3—3 of FIGURE 2.

FIGURE 4 is a vertical sectional view taken along line 4—4 of FIGURE 2 through a portion of the machine along the axis of the article handling unit.

FIGURE 4a illustrates an upward extension of the structure shown in FIGURE 4.

FIGURE 4b illustrates a downward extension of the structure shown in FIGURE 4.

FIGURE 5 is a plan view of the outer end of one of the tong units showing the tongs thereof in open condition.

FIGURE 6 is a transverse vertical sectional view taken substantially along line 6—6 of FIGURE 2.

FIGURE 7 is a vertical sectional view taken substantially along line 7—7 of FIGURE 6.

FIGURE 8 is a transverse sectional view taken along line 8—8 of FIGURE 2.

FIGURE 9 is a horizontal sectional view taken along line 9—9 of FIGURE 4b.

FIGURE 10 is a horizontal sectional view taken along line 10—10 of FIGURE 1 and showing the improved control valve of this invention.

FIGURE 11 is a vertical sectional view taken along line 11—11 of FIGURE 10.

FIGURE 12 is a side elevational view of the control valve taken along line 12—12 of FIGURE 10.

FIGURE 13 is a horizontal sectional view taken along line 13—13 of FIGURE 11.

With reference to the drawings, I have illustrated my glass-transferring machine 1 as being of the same general structure disclosed in said Patent No. 2,415,997. Only the parts of this machine necessary for an understanding of the improvements of this invention will be referred to herein as all the other details of the machine are fully disclosed in said patent. This machine is shown as being carried on an extension 2 of the base 3 of a glass-forming machine which is indicated generally by the numeral 4. The forming machine 4 may be of the intermittently operating type and includes an intermittently rotatable mold table 5 which supports a plurality of circumferentially spaced mold units 6. The usual lifting valve arrangement 7 is provided on the forming machine for lifting the article 8 above the upper edges of the mold into the take out position, as shown in FIGURE 1. My machine is adapted to engage and grip the article at this point while the mold table 5 is stationary and to transfer the article to the other side of the machine through an arc of approximately 180° where it is deposited on a conveyor unit 9. Also, as shown in FIGURE 1, with my machine the article 8 is inverted before being deposited on the conveyor unit. The conveyor unit 9 illustrated is of a continuously moving type consisting of a plurality of longitudinally spaced spindle units 10 carried on an endless chain 11. Each of the spindle units has a rotatable article-receiving form 12 on its upper end. The conveyor unit 9 which is shown in this figure may be part of a glassware glazer. However, it is to be understood that my machine is not limited in its use to association with machines of the type shown in FIGURE 1.

In general, my machine consists of a base and supporting standard 13, a rotatable turret 14 supported on the standard 13, a plurality of radially extending, circumferentially spaced, article handling units 15 carried by the turret, a control cam unit 16 mounted in fixed position above the rotatable turret 14 for controlling certain operations of the article handling units 15, and a cam track 89 which controls inversion of the article handling units 15. Any suitable number of the units 15 may be provided.

The improved article handling units 15 are illustrated in FIGURES 1 to 9, inclusive. As shown and described in said patent, these units are carried by the turret 14 in such a manner that swinging movement horizontally and limited radial movement is permitted during rotation of the turret but the details of the mechanism for accomplishing these movements are not important in this present application.

The turret 14 includes the supporting plate member 42 which is carried by a rotatable sleeve 39 that supports the turret 14. The member 42 supports angularly spaced horizontally disposed radially directed sleeves 47, each of which is part of an article handling unit 15. Each sleeve 47 is further provided with an upstanding cylindrical extension 48 on its upper side, as shown in FIGURES 4 and 4a. The sleeve 47 has mounted therein for rotating and axial movement, a tong-operating cylinder 49. The cylinder 49 tightly fits within the outer end of the sleeve 47 and is provided with an inwardly extending integral shaft portion 50 which is rotatable and slidable within a bearing structure 51 provided at the inner end of the sleeve 47. The cylinder 49 is closed at its inner end and a separate cap member 52 (FIGURE 4a) is provided in association with this sleeve and with the upward extension 48. The shaft 50 extends into this member 52 through a fluid seal 53. The shaft 50 is provided with a fluid passageway 54 extending therethrough which communicates at its outer end with the chamber 55 within the cylinder 49 and at its inner end with a chamber 56 formed within the cap 52. The upper end of the chamber 56 communicates with a passageway 57 that extends upwardly through the cylindrical extension 48 on the sleeve 47. Fluid is supplied through the passageway 57, the chamber 56 and the passageway 54 to the chamber 55 from a source to be disclosed hereinafter. The shaft 50 extends within the chamber 56 a substantial distance so as to permit axial movement of the cylinder 49 while still maintaining communication between the inner end of the passageway 54 and the chamber 56.

The means for producing limited radial movement of each cylinder 49 upon swinging movement of the corresponding article handling unit 15 includes the cam structure 61 (FIGURE 4) having the cam groove 66. Co-operating with the cam groove 66 is a follower in the form of a roller 67 mounted on a vertical axis. This roller 67 is carried on the outer end of a radially extending arm 68 which is mounted for sliding movement in a radial slot formed in the lower surface of the member 42. The arm 68 carries adjacent its outer end an upstanding yoke 69 which extends behind the cylinder 49 and which embraces the shaft 50. It will be apparent that with this structure, when the roller 67 moves to different positions in the cam groove 66, the arm 68 will be moved radially in the member 42 and, thereby, will move the cylinder 49 axially outwardly due to engagement of the fork 69 with the inner end thereof. Inward axial movement of the cylinder 49 occurs when the roller 67 moves the arm 68 inwardly, due to engagement of the fork 69 with the forward end of a pinion 70 which is formed integral with the shaft 50.

As previously indicated, it is desirable to invert the article during rotation of the turret. The pinion 70 forms a part of this inverting mechanism. The pinion 70 is elongated and is disposed within the sleeve 47 for radial movement with the cylinder 49 with which it is integrally formed. As shown in FIGURE 2, one side of the sleeve 47 is provided with a vertical slot 71 in which a rack-bar 72 is mounted for vertical movement. This rack-bar 72 engages the pinion 70 and passes downwardly (FIGURE 4) through an opening formed in the member 42 and through a depending cylinder 78 which is secured below such member 42.

The lower end of the rack-bar 72 is provided with a horizontal extension 76 which carries a downwardly extending pivot pin 77 that is disposed co-axial with the cylinder 78 into which the lower end of the rack-bar extends. This cylinder 78 has a flange 65 on its upper end which is bolted by means of the bolts 80 to the lower surface of the plate member 42. The pivot pin 77 on the lower end of the rack-bar 72 extends into a ball bearing 82 carried in the upper end of a piston 83. Thus, the rack-bar will be rotatably connected to the piston. The piston includes a depending guide sleeve 84 which extends through a central opening in the bottom of the cylinder 78. The lower end of this sleeve 84 has a cross-shaped slide member 85 (FIGURES 4b and 9) which slides vertically in a cross-shaped guide slot 86 that is vertically disposed and is formed in a fixed member 87 which has its upper end attached to the lower end of the cylinder 78. One of the horizontal arms of the slide member 85 carries a cam follower which is in the form of a roller 88 supported for rotation on a horizontal axis. This roller operates in a closed endless cam track 89 (FIGURE 1) which extends horizontally and helically around the sleeve 90 of the standard 13. The sleeve 90 is vertically adjustable by means including the jackscrews 31.

It will be apparent that with this rack and pinion structure, when the turret rotates, the roller 88 of each of the article handling units will travel in the continuous closed cam 89. The inclined portion thereof will produce a vertical movement of the cross-shaped slide member 85 in the vertical guide slot 86. However, this guide structure will prevent swinging movement of the member 85 about the axis of member 84. Thus, there will be no danger of misplacement of roller 88 from the cam track 89. The piston 83 will also be moved vertically, thereby causing the corresponding vertical movement of the rack-bar 72. This, in turn, will cause rotation of the pinion 70, and consequently, of the shaft 50. Positive upward and downward movement of the rack-bars 72 of the units 15 will be insured since the rollers 88 operate in the closed cam 89. Radial movement of the shaft 50 of each unit 15 will be permitted without interfering with the intermeshing relationship of rack-bar 72 and the pinion 70, due to the fact that such pinion is elongated.

Each cylinder 49 carries an article gripping tong structure, or tong unit 91. This tong unit 91 is illustrated best in FIGURES 2 to 7, inclusive. This tong unit is improved in accordance with this invention to provide an arrangement whereby precise controlled movement of the tong jaws results from movement of an operating piston, the jaws are relatively adjustable, and their speed of opening can be controlled. Control of the jaws is enhanced since the movement of the jaws is slight as compared to the stroke of the piston. Also, the structure of the tong unit is greatly simplified and parts are interchangeable, since each tong jaw and its supporting structure is identical with the other. Also, the overall size of the tong unit is reduced since the unit is more compact.

Each tong unit 91 is supported by means of a yoke member 92. On its inner end this member 92 is provided with a peripheral flange 93 (FIGURES 2, 4 and 5) which is bolted by bolts 96 to a peripheral flange 97 on the outer end of the cylinder 49. A piston 95 is reciprocably mounted in the cylinder 49 and has a piston rod 94 extending outwardly therefrom through aligning openings in the outer end of the cylinder 49 and the inner end of the supporting yoke 92. A bearing and fluid seal structure 98 is provided in the opening in the member 92 in surrounding relationship to the piston rod 94. A screw 98a controls a vent passageway that extends through the member 92 and adjustment of this screw will control the speed of outer movement of the piston 95 by regulating the pressure developed in the chamber 55. This will control the speed of closing of the jaws of the tong unit. The rod 94 is provided with a stop flange 101 which contacts member 92 to limit inward movement of the rod 94 into the cylinder 49 and, consequently, inward movement of the piston 95 into the cylinder so that the rear surface of the piston is always spaced from the inner end of the cylinder. The outer end of the piston rod 94 is flattened as indicated at 102.

The flattened portion 102 of the piston rod 94 extends between a pair of tong jaw supporting members 103 which support the article-engaging tong jaws 99 and which are identical with each other but are in reversed positions. Each of these members 103 has a pivot pin receiving section 104 which snugly fits within the arms of the joke 92 and which is provided with an opening for receiving a pivot bushing 105. The bushing 105 receives a pivot pin 106 which extends from the opposite ends thereof through aligning openings in the yoke 92. Between the section 104 of each member 103 is a thrust washer 107 and lubricant-supplying openings 108 extend through the adjacent portions of the yoke and the washers. Thus, each pivot pin 106 pivots a jaw-supporting member 103 to one of the outer corners of the yoke 92.

Each member 103 (FIGURES 5 to 7) has an inwardly extending bearing lug 109 which bears against the inner face of one of the arms of the yoke 92 and an inwardly extending gear segment 110 which bears against the inner face of the opposite arm of the yoke 92. These members are integral with the pivot section 104. As previously indicated, the members 103 are identical and interchangeable. The sections 110 are interleaved with each other and with the flat portion 102 of the piston rod which is disposed between the two sections 110. Each section 110 has the teeth 111 formed on its inner edge which cooperate with adjacent rack members 112 carried by the flat portion 102 of the piston rod 94. The rack members 112 are mounted on opposite faces of the flat rod portion 102 and at opposite edges thereof for engaging oppositely extending segment sections 110 which are disposed at opposite faces of the rod portion 102.

It will be apparent that with this rack structure carried by the piston rod engaging the gear segments on the members 103 which are pivoted to the yoke 92, reciprocation of the rod 94 will result in the swinging of the members 103 about the pivots 106. The members 103 will swing outwardly and inwardly in accordance with the reciprocation of the rod 94. A tension spring 113 is connected between the members 103 and normally tends to swing these members inwardly toward each other and movement in the opposite direction is accomplished by supplying pressure behind the piston 95 through the passageway 54, the speed being regulated by the screw 98a as previously mentioned.

The jaw members 99 are mounted on the members 103 by means of attaching lugs 115 (FIGURES 2, 3 and 5) integral with their inner ends. Each lug is provided with slots 116a extending transversely thereof and through which the clamping bolts 116 pass, the bolts being threaded into the outer edges of the members 103. For accurate positioning of the jaws 99 relative to each other, an adjusting bolt 117 is associated with the outer edge of each lug 115. The bolts 117 are fixed axially but rotate in a mounting lug 118 carried by the members 103 and their inner ends are threaded into the lugs 115. Thus, if the clamp bolts 116 are released, the bolts 117 may be rotated to precisely locate one jaw 99 relative to the other. The jaws 99 are provided with clamps 99a to secure removable article contact segments 99b to the jaws 99.

It will be apparent that supplying fluid pressure into the chamber 55 behind the piston 95 will swing the jaws 99 apart against the action of the tension spring 113 which will tend to keep the tong jaws together and will close them when the pressure behind the piston 95 is eliminated.

The cam 89 results in positive up and down movement of the rack bar 72 and this movement will be sufficient to rotate the shaft 50 and the tong unit 91 through substantially 180° to invert the article gripped by the tong unit. However, positive stop means is employed for insuring that the rotation will be exactly 180°. This means is shown best in FIGURES 2 and 8 and comprises a stop arrangement associated with the rotatable cylinder 59. This stop arrangement will not interfere with axial movement of the shaft 50 relative to the sleeve 47. This stop arrangement comprises a stop bar 49a secured to the flange 97 of the cylinder 49 and extending inwardly over the sleeve 47. This stop bar is adapted to engage the heads of adjustable stop screws 68a which are disposed in the plate 42 at each side of the sleeve 47 at positions substantially 180° apart. Thus, the member 49 and the tong units carried thereby can only be rotated through 180° and will be positively stopped in its rotation at the stop points 49a which can be accurately adjusted to positions 180° apart.

However, with this positive stop arrangement, it is desirable to have a yieldable connection between the rack bar 72 and the cam follower or roller 88 which follows the inverting cam 89. This yieldable connection includes a pin 73d which is slidably mounted in the lower end of the sleeve 84 and which has a portion depending therefrom that carries the slide member 85. Within the sleeve 84 opposed compression springs 73a and 73b are provided around the pin 73d above and below a collar 73c fixed to the pin 73d. Ordinarily, the member 85 will move with the member 84 as a unit until rotation of the cylinder 49, produced by vertical movement of the rack bar 72, is stopped by contact of the bar 49a with one of the stop pins 68a. However, when this contact occurs, the corresponding spring 73a or 73b will be compressed. Thus, the connection will yield, if necessary, up or down as the stop bar 49a contacts either of the stop screws 68a.

The air system for controlling the operation of the tong units of the various article handling units 15 will now be described. This system is illustrated best in FIGURES 1, 4a, and 10 to 13, inclusive.

The upper end of each of the cylindrical extensions 48 of sleeve 47 (FIGURE 4a) is reduced and fits tightly within a collar 124. The collars 124 are carried by a rotatable annular support 125 which surrounds the turret-supporting sleeve 39 and which rests on a shoullder 126 formed on the sleeve and is keyed to the sleeve. A cap 127 is provided on top of the collar 124 and is suitably secured thereto. This cap has a chamber 128 formed therein with which the passageway 57 in extension 48 communicates. The upper reduced end of the extension 48 is rotatable within the collar 124 so as not to interfere with swinging of the unit 15 as described in said patent. Within the cap 127 a fluid-tight seal 129 is provided in association with the upper further reduced extremity of the extension 48 in such a manner as to permit this rotation without leakage from the chamber 128. Resting on the upper surface of the support 125 and being rotatable therewith is a disk-like member 130 which surrounds the sleeve 21 and which rests on the upper end of the sleeve 39. The member 130 has a plurality of radially extending air supply passageways 131, one being provided for each of the units 15. The inner ends of each of these passageways 131 communicates with a vertical passageway 132 which has its upper end connected to an annular chamber 133. This chamber is formed by the cooperation of a collar 134 with the upstanding sleeve 135 formed on the member 130. The member 134 is attached by bolts to a non-rotatable bearing sleeve 136 (FIGURE 4a) which, as disclosed in said patent, is splined on the upper end of fixed post 19 for vertical movement and which rotatably receives the upper end of the sleeve 21 that rotatably supports the sleeve 39. A valve-supporting ring 137 is bolted to the annular shoulder 138 on the outer edge of member 130 and overlaps a peripheral flange 139 on the lower edge of collar 134. Thus, the member 130 may rotate relative to the stationary member 134. To permit this rotation without leakage of fluid from chamber 133, an annular fluid-tight seal 140 is provided between the lower part of member 134 and the central part of member 130 and a similar seal 141 is provided between the upper part of member 134 and the upper end of the sleeve 135 of the member 130. A vertical passageway 142 formed in the member 134 supplies air to the chamber 133. An inlet 142a (FIGURE 4a) at the upper end of passageway 142 is connected to a suitable source of air pressure.

Each of the air supply passageways 131 in the member 130 is connected by means of a line 144 (FIGURES 1, 4a and 11) to the housing 145a of the valve 145. These valves are carried at angularly spaced intervals by the ring 137 which is carried by the rotatable member 124 for rotation therewith. A line 147 leads from the valve housing 145a to the chamber 128 at the top of the extension 48 of the member 47. The valve unit 145 is shown best in FIGURES 10 to 13 and includes the rotatable core 154 which has the vertically extending grooves 143 and 143a formed therein at diametrically opposed locations. An exhaust outlet or vent line 150 is connected to the valve housing 145a at the same level as the connection of the line 147, whereas it will be noted that the line 144 is connected at a higher level but both levels are within the vertical extent of the grooves 143 and 143a. The vent line 150 is controlled by a manually adjustable valve cock 149 (FIGURE 12) which will control the speed of venting of the pressure end of the cylinder 49 and thereby cushion the return movement of the tong-actuating piston 95.

The core 154 is rotatable within the housing 145a, being vertically disposed therein, but is prevented from moving axially therein by the bearing structure shown best in FIGURE 11. This structure includes a thrust ball bearing 151 disposed around a reduced lower end of the core 154 and held in place by a cap 152 bolted to the lower end of the housing 145a. It also includes a thrust ball bearing 151a within the upper end of the housing and surrounding a reduced and shouldered upper end of the core 154. Directly below the bearing 151a is a fluid seal 153. Thus, rotation of the core 154 will be permitted but axial movement thereof relative to the housing 145a will be precluded. At a level corresponding to the level of the vent 150, the core 154 is provided with transverse L-shaped passages 143b and 143c which communicate at one end with the lower ends of the grooves 143 and 143a respectively and which have their other ends terminating at the peripheral surface of the core 154.

With the valve core 154 in the position shown in FIGURES 11 and 13, the end of the air supply line 144 will be covered by the core. The line 147 will be vented through the passage 143c, and the groove 143a which communicates with the vent line 150. Therefore, the piston 95 will be in the tong-closing position shown in FIGURE 4. If the core 154 is now turned a quarter turn clockwise, the vent line 150 will be closed and the lines 144 and 147 will communicate through the groove 143a. On the next quarter turn clockwise, the end of the passageway 143b will be in alignment with the line 147 and the groove 143 will communicate with the vent line 150 and will vent the line 147 again.

For controlling rotation of the valve core 154, a four-point starwheel 155 is keyed to the upper end thereof. A brake is associated with the starwheel for normally preventing rotation thereof and this brake comprises an adjustable spring-plunger 156 mounted on the housing 145a, and including a ball 156a which successively cooperates with four notches 156b in the periphery of the hub of the starwheel 155. A notch is provided in the hub of the starwheel just below the vertex of each of the four angles of the starwheel. The starwheel 155 is rotated one-quarter of a turn for each actuation of the valve. This rotation is accomplished by means of a trigger pin 171 depending from the fixed cam unit 16.

Thus, as the turret 14 rotates counterclockwise, the starwheels 155 of the successive valves 145 are engaged so that the cores 154 thereof are successively turned through a quarter turn.

The valves 145 are so constructed that if it is desired to substitute vacuum chucks on the machine for the mechanical tongs, the valves can function as vacuum control valves. Vacuum pressure will not displace the valve core 154 axially due to its special mounting.

It wil be apparent from the above description that I have provided an improved article-handling machine. The improvements are mainly in the article-handling units of the machine, especially in the tong units thereof; in the control of the inverting mechanism cooperating with the tong units; and in the air control system for the tong units.

Having thus described my invention, what I claim is:

1. In an article handling unit, a tong structure supported by a yoke member having a pair of spaced arms with flat inner relatively parallel faces, laterally spaced parallel pivot pins carried by said arms, a flattened actuating rod extending outwardly through said yoke between said flat arms thereof and being reciprocable in said yoke between said arms in a plane at right angles to said pivot pins, said actuating rod having opposed flat faces substantially parallel to said inner flat faces of said yoke arms, and opposed outer edges and carrying rack sections on its opposed faces adjacent its opposed outer edges, each of said opposed rack sections having teeth facing inwardly, a pair of jaw supporting members mounted for relative pivotal movement about the axes of said pivot pins, jaws adjustably mounted on said members, each of said members having a pivot pin receiving section mounted on one of said pivot pins and snugly fitting within said flat yoke arms and having an inwardly extending bearing lug which has an outer face that bears against the inner face of the adjacent arm of the yoke and an axially spaced opposed radially inwardly extending gear segment which has an outer face that bears against the inner face of the opposite arm of the yoke, the gear segments extending over opposite faces of the actuating bar inwardly in opposite directions from the opposed edges thereof and engaging the inwardly directed teeth on the respective rack sections carried by said bar, means for moving said actuating bar, said means comprising a fluid actuated unit connected thereto, and means for controlling the flow of fluid to and from said unit to control movement of said bar.

2. In an article handling unit, a tong structure supported by a yoke member having a pair of spaced arms having flat inner relatively parallel faces, laterally spaced parallel pivot pins carried by said arms, a flattened actuating rod extending outwardly through said yoke between said flat arms thereof and being reciprocable in said yoke between said arms in a plane at right angles to said pivot pins, said actuating rod having opposed flat faces substantially parallel to said inner flat faces of said yoke arms and opposed outer edges and carrying rack sections on its opposed faces adjacent its opposed outer edges, each of said opposed rack sections having teeth facing inwardly, a pair of jaw supporting members mounted for relative pivotal movement about the axes of said pivot pins, each of said members having a pivot pin receiving section mounted on one of said pivot pins and snugly fitting within said flat yoke arms and having an inwardly extending bearing lug which has an outer face that bears against the inner face of the adjacent arm of the yoke and an axially spaced opposed radially inwardly extending gear segment which has an outer face that bears against the inner face of the opposite arm of the yoke, the gear segments extending over opposite faces of the actuating bar inwardly in opposite directions from the opposed edges thereof and engaging the inwardly directed teeth on the respective rack sections carried by said bar, and means for moving said actuating bar.

3. A tong structure comprising a supporting member, laterally spaced parallel pivot pins carried by said member, an actuating rod carried by said supporting member and being reciprocable relative thereto in a plane at right angles to said pivot pins, said actuating rod having opposed flat faces and opposed outer edges and carrying rack sections on its opposed faces adjacent its opposed outer edges, each of said opposed rack sections having teeth facing inwardly, and a pair of jaw supporting members mounted for relative pivotal movement about the axes of said pivot pins, each of said members having a pivot pin receiving section mounted on one of said pivot pins and a radially extending gear segment which has gear teeth on its free end, the gear segments extending over opposite faces of the actuating bar inwardly in opposite directions from the opposed edges thereof and engaging the inwardly directed teeth on the respective rack sections carried by said bar.

4. A tong structure comprising a supporting member, laterally spaced parallel pivot pins carried by said member, an actuating rod carried by said supporting member and being reciprocable relative thereto at right angles to said pivot pins, said actuating rod carrying at opposite sides thereof opposed rack sections which have teeth facing inwardly towards the axis of reciprocation thereof, and a pair of jaw supporting members mounted for relative pivotal movement about the axes of said pivots, each of said members having a radially inwardly extending gear segment which has gear teeth on its inner free end, the gear segments extending inwardly over opposite sides of the bar in opposite directions and the teeth thereof engaging the inwardly directed teeth on the respective rack sections carried by said bar.

References Cited in the file of this patent

UNITED STATES PATENTS

| | | |
|---|---|---|
| 1,207,515 | Duggan et al. | Dec. 5, 1916 |
| 1,285,695 | Harman | Nov. 26, 1918 |
| 1,777,248 | Bergquist | Sept. 30, 1930 |
| 1,851,923 | McQuigg | Mar. 29, 1932 |
| 1,899,750 | Dorman | Feb. 28, 1933 |
| 1,935,739 | Freese | Nov. 21, 1933 |
| 2,415,997 | Eldred | Feb. 18, 1947 |
| 2,611,493 | Nordquist | Sept. 23, 1952 |